(12) United States Patent
Sewalt et al.

(10) Patent No.: US 8,591,823 B2
(45) Date of Patent: Nov. 26, 2013

(54) SYSTEMS AND METHODS FOR TREATING AIR STREAMS EXHAUSTED FROM FIRING KILNS

(75) Inventors: Renee Rochelle Sewalt, Elmira, NY (US); Michael James Vayansky, Elkland, PA (US)

(73) Assignee: Corning Incorporated, Corning, NY (US)

( * ) Notice: Subject to any disclaimer, the term of this patent is extended or adjusted under 35 U.S.C. 154(b) by 404 days.

(21) Appl. No.: 12/862,952

(22) Filed: Aug. 25, 2010

(65) Prior Publication Data

US 2011/0052469 A1 Mar. 3, 2011

Related U.S. Application Data

(60) Provisional application No. 61/237,794, filed on Aug. 28, 2009.

(51) Int. Cl.
*B01D 53/68* (2006.01)
*B01D 53/74* (2006.01)
*F27B 9/00* (2006.01)

(52) U.S. Cl.
USPC ............................. 422/187; 422/169; 432/72

(58) Field of Classification Search
USPC .................... 202/98; 422/129, 168, 169, 187; 432/72, 121, 150, 152, 193; 264/29.1, 264/652
See application file for complete search history.

(56) References Cited

U.S. PATENT DOCUMENTS

| | | | | |
|---|---|---|---|---|
| 2,983,022 A | * | 5/1961 | Dressler et al. | 264/37.14 |
| 3,822,190 A | * | 7/1974 | Fischer | 202/98 |
| 4,213,947 A | * | 7/1980 | Fremont et al. | 422/177 |
| 5,069,618 A | * | 12/1991 | Nieberding | 432/137 |
| 5,810,581 A | | 9/1998 | Martin et al. | |
| 6,089,860 A | * | 7/2000 | Dull et al. | 432/72 |
| 6,325,963 B1 | | 12/2001 | Dull et al. | |

\* cited by examiner

*Primary Examiner* — Jill Warden
*Assistant Examiner* — Joye L Woodard
(74) *Attorney, Agent, or Firm* — Matthew B. McNutt

(57) ABSTRACT

A system for treating an air stream exhausted from a firing kiln utilized to heat a ceramic substrates includes an outlet assembly and a thermal oxidizer. The outlet assembly may be in fluid communication with the firing kiln, and may be operational to receive an exhaust gas stream and a waste heat stream from the firing kiln. A temperature of the waste heat stream may be greater than the exhaust gas stream such that a temperature of an air stream comprising the waste heat stream and the exhaust gas stream within the outlet assembly is greater than the exhaust gas stream. The thermal oxidizer may be in fluid communication with the outlet assembly to receive the air stream and remove pollutants from the air stream.

10 Claims, 4 Drawing Sheets

SYSTEMS AND METHODS FOR TREATING AIR STREAMS EXHAUSTED FROM FIRING KILNS

CROSS-REFERENCE TO RELATED APPLICATIONS

This application claims the benefit of priority under 35 U.S.C. §119(e) of U.S. Provisional Application Ser. No. 61/237,794 filed on Aug. 28, 2009.

BACKGROUND

1. Field

The present specification generally relates to systems and methods for treating air streams, such as those exhausted by firing kilns during the firing of ceramic honeycomb substrates.

2. Technical Background

Manufacturing processes for ceramic honeycomb filters such as those used to manufacture diesel particulate filters (e.g., firing processes) may produce undesirable waste pollutants as by-products. Such pollutants may include volatile organic compounds ("VOCs"), carbon monoxide (CO), and hydrogen fluoride, for example. These pollutants may be emitted during the firing process in which the ceramic material is subjected to high temperatures. Because governments place limits on the amount of pollutants that may be released into the environment, the pollutants within the air stream created by the firing process need to be removed from the air stream prior to releasing the air stream to the atmosphere.

Thermal oxidizers, such as recuperative thermal oxidizers and catalytic thermal oxidizers, are treatment devices that may be integrated into firing kiln exhaust systems to destroy VOCs and CO in an air stream created during the firing process. Certain thermal oxidizers may require an operating temperature range of about 300° C. to about 650° C. to effectively destroy VOCs and CO that may be present in the air stream. Because of this high operating temperature, these treatment devices require one or more external heating sources, such as a burner, to raise the temperature of the air stream (with pollutants) entering the thermal oxidizer. However, the use of an auxiliary burner or burners to heat the exhaust air stream adds substantial energy costs to the manufacturing process.

Accordingly, a need exists for alternative systems and methods of treating air streams exhausted by firing kilns during the firing process.

SUMMARY

In one embodiment, a system for treating an air stream exhausted from a firing kiln utilized to heat a ceramic substrate may include an outlet assembly and a thermal oxidizer. The outlet assembly may be in fluid communication with a firing kiln, and may be operational to receive an exhaust gas stream and a waste heat stream from the firing kiln. A temperature of the waste heat stream may be greater than the exhaust gas stream such that a temperature of an air stream comprising the waste heat stream and the exhaust gas stream within the outlet assembly is greater than the exhaust gas stream. The thermal oxidizer may be in fluid communication with the outlet assembly to receive the air stream and remove pollutants from the air stream.

In another embodiment, a method for removing pollutants from an air stream exhausted from a firing kiln utilized to heat ceramic substrates may include providing an outlet assembly in fluid communication with a firing kiln, an exhaust gas stream from the firing kiln to the outlet assembly, and a waste heat stream from the firing kiln to the outlet assembly. A temperature of the waste heat stream may be greater than the exhaust gas stream. The method may further include creating an air stream comprising the waste heat stream and the exhaust gas stream. A thermal oxidizer may be provided in fluid communication with the outlet assembly, and the method may further include receiving the air stream and removing pollutants within the air stream within the thermal oxidizer.

In yet another embodiment, a method for removing pollutants from an air stream exhausted from a firing kiln utilized to heat ceramic substrates may include mixing a waste heat stream with an exhaust gas stream to form an air stream. A temperature of the waste heat stream may higher than a temperature of the exhaust gas stream. The air stream may then be provided to a thermal oxidizer where pollutants are removed therefrom. The flow of the waste heat stream may be controlled such that a temperature of the air stream is in the range of about 300° C. to about 650° C. as the air stream enters the thermal oxidizer.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE PREFERRED EMBODIMENTS

Figure 1:
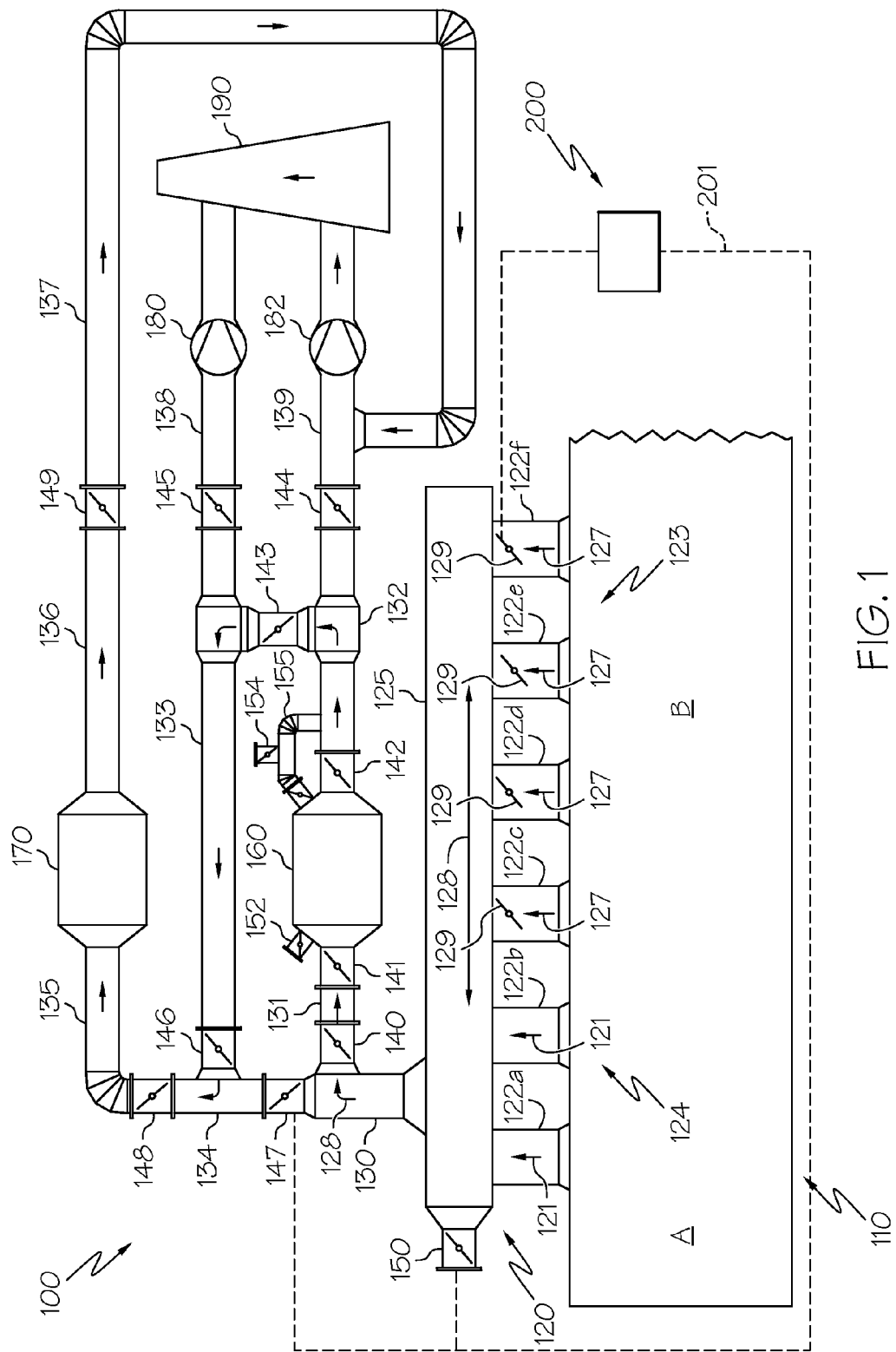
FIG. 1 schematically depicts a system for treating an air stream operating in a first mode of operation according to one or more embodiments.

Reference will now be made in detail to various embodiments of the systems and methods for treating air streams exhausted from a firing kiln, examples of which are illustrated in the accompanying drawings. Whenever possible, the same reference numerals will be used throughout the drawings to refer to the same or like parts.

Generally, embodiments described herein treat an air stream or streams exhausted from a firing kiln utilized during manufacturing processes for ceramic honeycomb substrates. As described herein, embodiments utilize waste heat generated by manufacturing processes to maintain an air stream entering a catalytic thermal oxidizer within a desired operating temperature range to effectively destroy volatile organic compounds ("VOC's"), carbon monoxide (CO) and other pollutants that may be present in low temperature regions of the firing kiln. Particularly, as described herein, an exhaust gas stream comprising pollutants may be drawn from low temperature regions of the firing kiln and may be mixed with a waste heat stream that may be drawn from high temperature regions (streams that are substantially free of pollutants) to form an air stream having an elevated temperature. This air stream with the elevated temperature may then enter an inlet of the catalytic thermal oxidizer and pass through a catalyst where an exothermic oxidation reaction reduces the VOCs and CO levels within the air stream.

Referring to FIG. 1, an exemplary system for treating an air stream exhausted from a firing kiln is schematically depicted. The system 100 generally comprises a firing kiln 110 (or other heat generating apparatus), an outlet assembly 120, a catalytic thermal oxidizer 160, an air stream conditioning assembly 170 (e.g., a hydrofluoric scrubber), exhaust fans 180, 182, an exhaust 190, and various ducts (e.g., duct 130), damper assemblies (e.g., damper assembly 147) and ambient air inlets (e.g., ambient air inlet 152). It will be understood that other configurations are also possible, and some embodiments may comprise more or fewer components. For example, in one embodiment, the system may not include an air stream conditioning assembly. Other duct, vent, ambient air inlet and fan arrangements are also possible without departing from the scope and spirit of the present disclosure.

During the process of firing ceramic honeycomb substrates, a ceramic substrate (not shown) may be passed through the firing kiln 110 by entering the kiln at region "A" and traveling through the kiln toward region "B" to complete a firing process step in which the ceramic substrate is baked and hardened for further processing. In the illustrated embodiment, the temperatures produced by the firing kiln increases toward the center of the kiln (i.e., toward the higher temperature region "B" of the firing kiln 110). As such, temperatures are higher in the regions illustrated toward region "B" of the firing kiln 110 than region "A." For example, the temperature within a firing kiln may reach about 1400° C. in certain high-temperature regions.

When passing through the kiln, the ceramic material may emit pollutants such as VOCs, CO and hydrogen fluoride. It may be desired to remove the pollutants (i.e., the exhaust gas stream) from the firing kiln while such pollutants are in the low temperature region. Otherwise, when pollutants are removed while in higher temperature regions, combustion of the pollutants may cause the kiln to operate at a temperature that is higher than desired.

As stated above, the air in downstream portions of the firing kiln is often at a higher temperature and significantly free (i.e., significantly free or free) of pollutants as compared with upstream portions. Traditionally, such high temperature air has been exhausted to the atmosphere after a series of cooling steps. As described in detail below, embodiments described herein utilize the high temperature waste heat generated by the firing kiln 110 to heat an exhaust gas stream prior to entering a catalytic thermal oxidizer 160 and/or an air stream conditioning assembly 170.

As illustrated in FIG. 1, the outlet assembly 120 may be in fluid communication with the firing kiln 110 and may be configured to receive an exhaust gas stream 121 and a waste heat stream 127. The outlet assembly 120 may comprise an exhaust header 125, an exhaust duct assembly 124 that pulls the exhaust gas stream 121 from the lower temperature regions (e.g., lower temperature region "A") of the firing kiln 110, and a waste heat duct assembly 123 that pulls the waste heat stream 127 from the higher temperature regions (e.g., higher temperature region "B"). The waste heat stream 127 has a temperature that is greater than the exhaust gas stream 121 and is substantially free (i.e., substantially free or free) of pollutants. The exhaust duct assembly 124 and waste heat duct assembly 123 may be coupled to the exhaust header 125 wherein the exhaust gas stream 121 and the waste heat stream 127 may mix to form an air stream 128 that exits the exhaust header 125. The air stream 128 has a temperature that is greater than the temperature of the exhaust gas stream 121.

The exhaust gas stream 121 and waste heat stream 127 may be drawn from the firing kiln 110 by exhaust fans 180 and 182, which create a pressure differential in order to draw the exhaust gas stream 121 and waste heat stream 127 toward the exhaust 190 that is open to the atmosphere. It will be understood that any number of exhaust fans may be used to draw the exhaust gas stream 121 and the waste heat stream 127 from the firing kiln 110.

The exhaust housing units 122a-122f may be configured as ducts capable of withstanding elevated temperatures, or any assembly capable of fluidly coupling the exhaust header 125 to the firing kiln 110 to enable the exhaust gas stream 121 and waste heat stream 127 to enter the exhaust header 125. The exhaust housing units 122a-122f may be positioned on a top surface of the firing kiln 110. In the illustrated embodiment, the waste heat duct assembly 123 of outlet assembly comprises four exhaust housing units 122c-122f that fluidly couple the outlet assembly 120 to the firing kiln 110 at the high temperature region. As illustrated in FIG. 1, waste heat is drawn up into the exhaust header 125 from the high temperature regions of the firing kiln 110 through exhaust housing units 122c-122f to form the waste heat stream 127. The waste heat has traditionally been exhausted to atmosphere after a series of cooling steps and not utilized in the treatment of air streams. The temperature of the waste heat stream 127 may vary depending on the type of firing kiln 110 used in the manufacturing process. The temperature of the waste heat stream 127 provided by the four exhaust housing units 122c-122f coupled to an exemplary firing kiln may be about 650° C., for example. At this elevated temperature, the waste heat stream 127 may be substantially free from pollutants such as VOCs and CO. It will be understood that more or fewer exhaust housing units may be utilized to pull the waste heat stream 127 from the high temperature regions of the firing kiln 110. In addition, additional exhaust or outlet assemblies may be associated with kiln to exhaust waste heat.

The exhaust gas stream 121 may be pulled from the lower temperature regions (e.g., region "A") of the firing kiln 110 and into the exhaust header 125 via the exhaust gas duct assembly 124, which may comprise two exhaust housing units 122a-122b. The exhaust gas duct assembly 124 may comprise more or fewer exhaust housing units. Because the exhaust gas stream 121 is pulled from lower temperature regions of the firing kiln, it comprises pollutants such as VOCs and CO that result from the firing of the ceramic material, as described above. The temperature of the exhaust gas stream 121 may vary depending on the type of firing kiln 110 used and how it is operated during in the manufacturing process. In one embodiment, the temperature of the exhaust gas steam 121 entering the exhaust header 125 may be about 200° C. The polluted air may be drawn up through the exhaust housing units 122a-122b and enter the exhaust header as exhaust gas stream 121 where it may mix with the waste heat stream 127 to form air stream 128. As described above, the waste heat stream 127 is combined with the exhaust gas stream 121 to raise the temperature of the resulting air stream 128. The high temperature air stream 128 may then be routed to the catalytic thermal oxidizer 160 where it is maintained at a temperature to enable the exothermic oxidation reaction to break down the VOCs and CO. In this manner, waste heat that would have traditionally been exhausted to atmosphere is combined with a pollutant laden exhaust gas stream to form an air stream of an elevated temperature that is then treated for the removal of pollutants.

As illustrated in FIG. 1, the outlet assembly 120 may further comprise an ambient air inlet 150 that may be opened to allow ambient air to enter the exhaust header 125 to further regulate the temperature of the air stream. If the temperature of the air stream (which may be monitored via thermal couples or other temperature sensing devices) is too high, the ambient air inlet 150 may be opened to lower its temperature. Conversely, if the temperature of the air stream is below a particular threshold, the ambient air inlet 150 may be closed. The ambient air inlets (150, 152, 154) may be opened and closed by control signals 201 provided by controller 200, such as a computer. In another embodiment, a heat exchanger may be provided to reduce the temperature of the air stream. Additionally, the air stream may continuously lose heat as it travels throughout the system 100.

The catalytic thermal oxidizer 160 may be in fluid communication with the outlet assembly by way of a duct 130 and damper assembly (damper assemblies 140 and 141). The air stream 128 may exit the exhaust header 125 through the duct 130 as illustrated in FIG. 1. The air stream 128 is illustrated as an arrow in a flow path after the exhaust header 125 and is not numbered after duct 130 to simplify the figures. In the illustrated embodiment, the double damper assembly (damper assemblies 140 and 141) couples duct 130 to the catalytic thermal oxidizer 160. The two damper assemblies 140 and 141 are used to provide a purged area within duct 131 and to make sure there is no air entry or exhaust entry within the catalytic thermal oxidizer 160. When dampers 140 and 141 are in an open position, the air stream flows into the catalytic thermal oxidizer 160, as illustrated in FIG. 1.

The catalytic thermal oxidizer 160 of the illustrated embodiment comprises an ambient air inlet 152 to further control the temperature within the catalytic thermal oxidizer 160. Optimum temperature within the catalytic thermal oxidizer 160 may depend on the type of oxidizer (e.g., thermal oxidizer, regenerative thermal oxidizer, etc.) and the particular application in which it is installed. In one embodiment, the temperature of the air stream entering the catalytic thermal oxidizer 160 is within the range of about 300° C. to about 650° C. As described above, this elevated temperature may be achieved by using waste heat of the firing kiln 110 rather than by the use of an auxiliary heat source. Therefore, the operational costs of the catalytic thermal oxidizer 160 may be reduced because an auxiliary heat source does not need to purchased, fueled or maintained. Although embodiments may be described herein by reference to a catalytic thermal oxidizer, it will be understood that other types of thermal oxidizers may be used (e.g., regenerative thermal oxidizers, regenerative catalytic thermal oxidizers, recuperative thermal oxidizers, etc.).

In some embodiments, an additional air stream conditioning assembly or assemblies may be incorporated into the system 100. For example, as illustrated in FIG. 1, the air stream conditioning assembly may comprise a hydrofluoric scrubber 170 that is used to remove additional pollutants from the air stream, such as hydrogen fluoride. Other types of air stream conditioning assemblies may also be included in the system 100 to remove other pollutants. The hydrofluoric scrubber 170 may have a temperature requirement that is different than the catalytic thermal oxidizer 160. For example, the hydrofluoric scrubber 170 may have an operating temperature that is less than 300° C. The system 100 may further comprise an additional ambient air inlet 154 that may be opened and closed to regulate the temperature of the air stream as it enters the hydrofluoric scrubber 170 such that it is less than 300° C.

The air stream that exits the catalytic thermal oxidizer 160 and/or the hydrofluoric scrubber 170 may be drawn out of the exhaust 190 by exhaust fans 180 and 182. The treated air stream has reduced pollutant levels as it exits to the atmosphere through the exhaust 190.

The operation of various modes of an exemplary system 100 will now be described. FIG. 1 schematically illustrates a first mode of operation in which a catalytic thermal oxidizer 160 and a hydrofluoric scrubber 170 are used concurrently to treat an air stream that exits to the atmosphere such that exhausted air stream meets pollution level requirements. The flow of the air stream throughout the system may be controlled by opening and closing damper assemblies within the system 100. The damper assemblies may be controlled by signals 201 (e.g., voltage, current) provided by a controller 200, which may be a computer coupled to control/driver hardware. Similarly, ambient air inlets within the system 100 may also be controlled by a controller 200. It is noted that the control signals 201 are represented by a dashed line to only ambient air inlet 150, damper assembly 147 and a single mechanical device 129 for ease of illustration. It should be understood that the controller is communicatively coupled to each ambient air inlet 150, 152, and 154, each damper assembly 140-149 and each mechanical device 129.

As described above, a waste heat stream 127 may be drawn from high temperature regions of a firing kiln 110 (e.g., high temperature region B) through the waste heat duct assembly 123 of the outlet assembly 120, and a pollutant laden exhaust gas stream 121 may be drawn from low temperature regions of the firing kiln 110 (e.g., low temperature region A) through the exhaust duct assembly 124 of the outlet assembly 120. The resulting air stream 128 exits the outlet assembly 120 into duct 130. In the first mode of operation of the exemplary system 100, damper assembly 147 is closed, thereby preventing the air stream from passing into duct 134. Rather, the air stream passes through open damper assemblies 140 and 141 and into the catalytic thermal oxidizer 160.

Waste heat streams 127 may be controllably introduced into exhaust header 125 (through electronic or mechanical devices 129) in order to mix with exhaust gas stream 121 to create an air stream 128 such that, with or without cooling introduction of ambient air inlet 150, the temperature of the air stream 128 is within the range of 300° C.-650° C. for entry into the catalytic thermal oxidizer 160. Accordingly, through controlling introduction of waste heat streams 127, the approximately 200° exhaust gas stream can be heated to a sufficient temperature for introduction into thermal oxidizer 160 without the requirement for a separate burner. Although embodiments described herein treat the air stream without an auxiliary heat source, it will be understood that the embodiments are not limited to this configuration, as the embodiments described herein may also be incorporated into systems that may utilize an auxiliary heat source in conjunction with waste heat.

The catalytic thermal oxidizer 160 breaks down VOCs and CO within the air stream. The ambient air inlet 152 is controlled to ensure that the air stream is at the correct temperature for efficient operation of the catalytic thermal oxidizer 160. The temperature of the air stream at various points within the system 100 may be measured by thermal couples positioned throughout the system 100.

The air stream may exit the catalytic thermal oxidizer 160 through open damper assembly 142 and pass through duct 132 where it may then turn left into open damper assembly 143. Damper assembly 144 is closed to route the air stream toward the hydrofluoric scrubber 170 and prevent it from going out of the exhaust 190 to atmosphere. The air stream turns left into duct 133 because damper assembly 145 is closed. It continues through open damper assemblies 146 and 148 and into the hydrofluoric scrubber 170 via duct 135. The hydrofluoric scrubber 170 may remove hydrogen fluoride from the air stream. The air stream exits the hydrofluoric scrubber 170 through duct 136 and passes through open damper assembly 149. The air stream then travels through duct 137 until it is pulled into duct 139 and out to atmosphere through exhaust 190 by exhaust fan 182.

Figure 2:
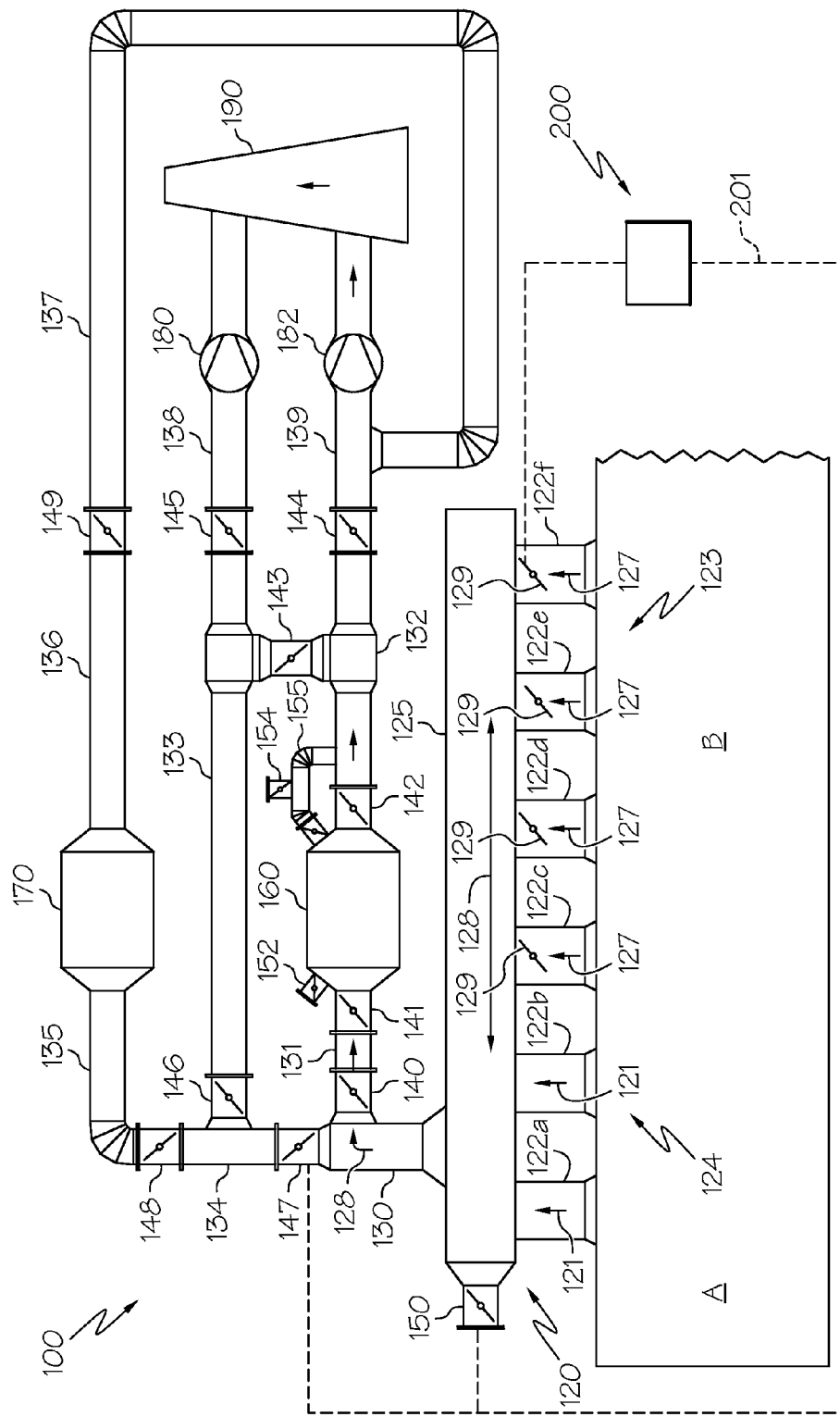
FIG. 2 schematically depicts a system for treating an air stream operating in a second mode of operation according to one or more embodiments.

FIG. 2 schematically illustrates a second mode of operation in which the catalytic thermal oxidizer 160 is in operation and the hydrofluoric scrubber 170 is by-passed. This mode may be used when the product being processed does not emit hydrogen fluoride, for example. The air stream 128 exits the outlet assembly 120 into duct 130. Damper assembly 147 is closed, thereby forcing the air stream 128 through open damper assemblies 140 and 141 and into the catalytic thermal oxidizer 160. The air stream exits the catalytic thermal oxidizer 160 through open damper 142, duct 132 and open damper assembly 144. The air stream then travels through duct 139, exhaust fan 182, and passes to atmosphere through exhaust 190.

Figure 3:
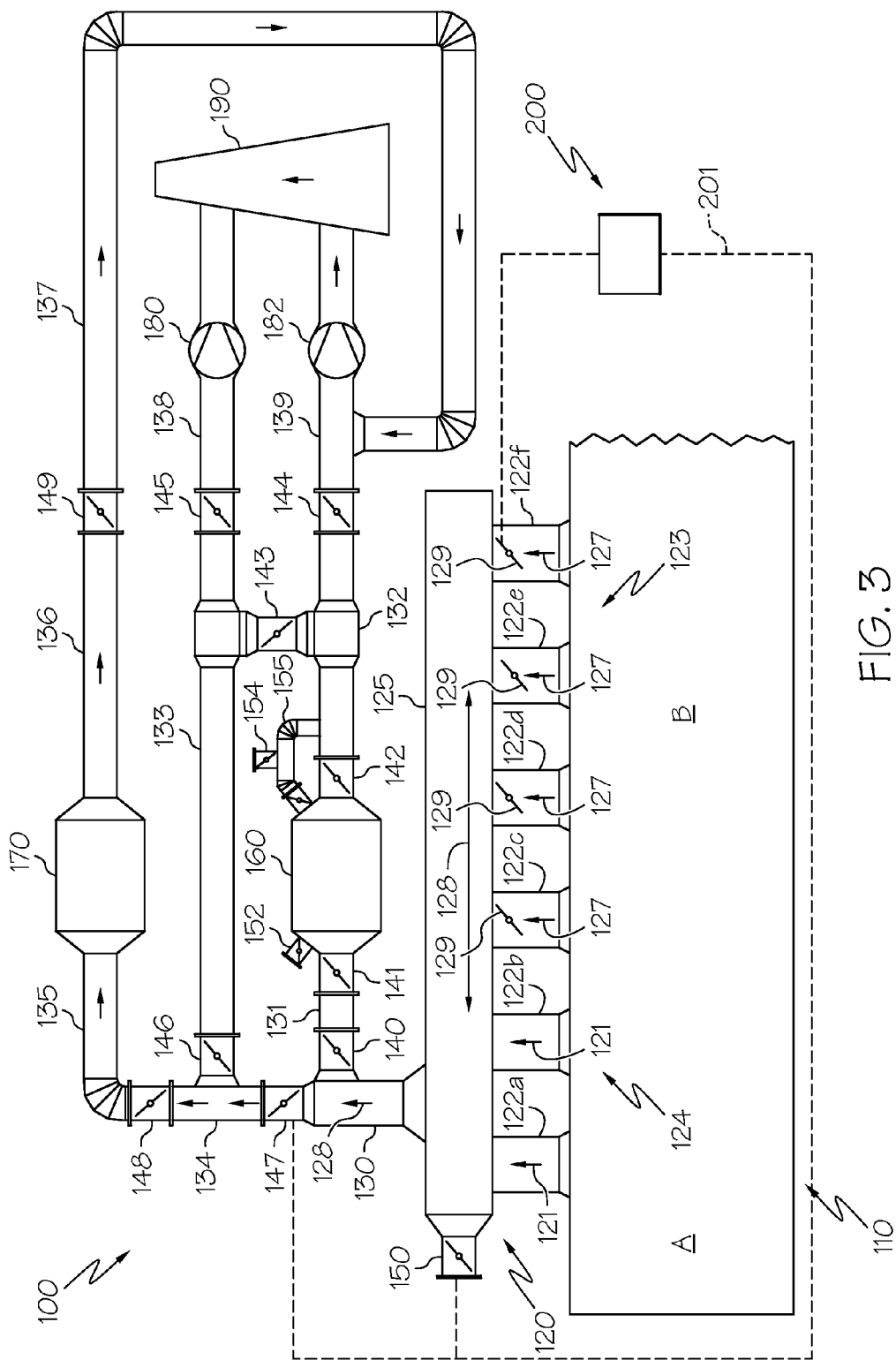
FIG. 3 schematically depicts a system for treating an air stream operating in a third mode of operation according to one or more embodiments.

FIG. 3 schematically illustrates a third mode of operation in which the hydrofluoric scrubber 170 is in operation and the catalytic thermal oxidizer 160 is by-passed. This mode may be used when the product being processed does not emit VOCs or CO, but does emit hydrogen fluoride, for example. The air stream 128 exits the outlet assembly 120 into duct 130 and is prevented from entering the catalytic thermal oxidizer 160 by closed damper assemblies 140 and 141. The air stream passes through open damper assembly 147 and into duct 134. Closed damper assembly 146 prevents the air stream from entering duct 133. Rather, the air stream passes through open damper assembly 148 and enters the hydrofluoric scrubber 170 through duct 135. The air stream exits the hydrofluoric scrubber 170 into duct 136, where it then passes through open damper assembly 149 into duct 137. The air stream then enters duct 139 and exits the system 100 by exhaust fan 182 and exhaust 190.

Figure 4:
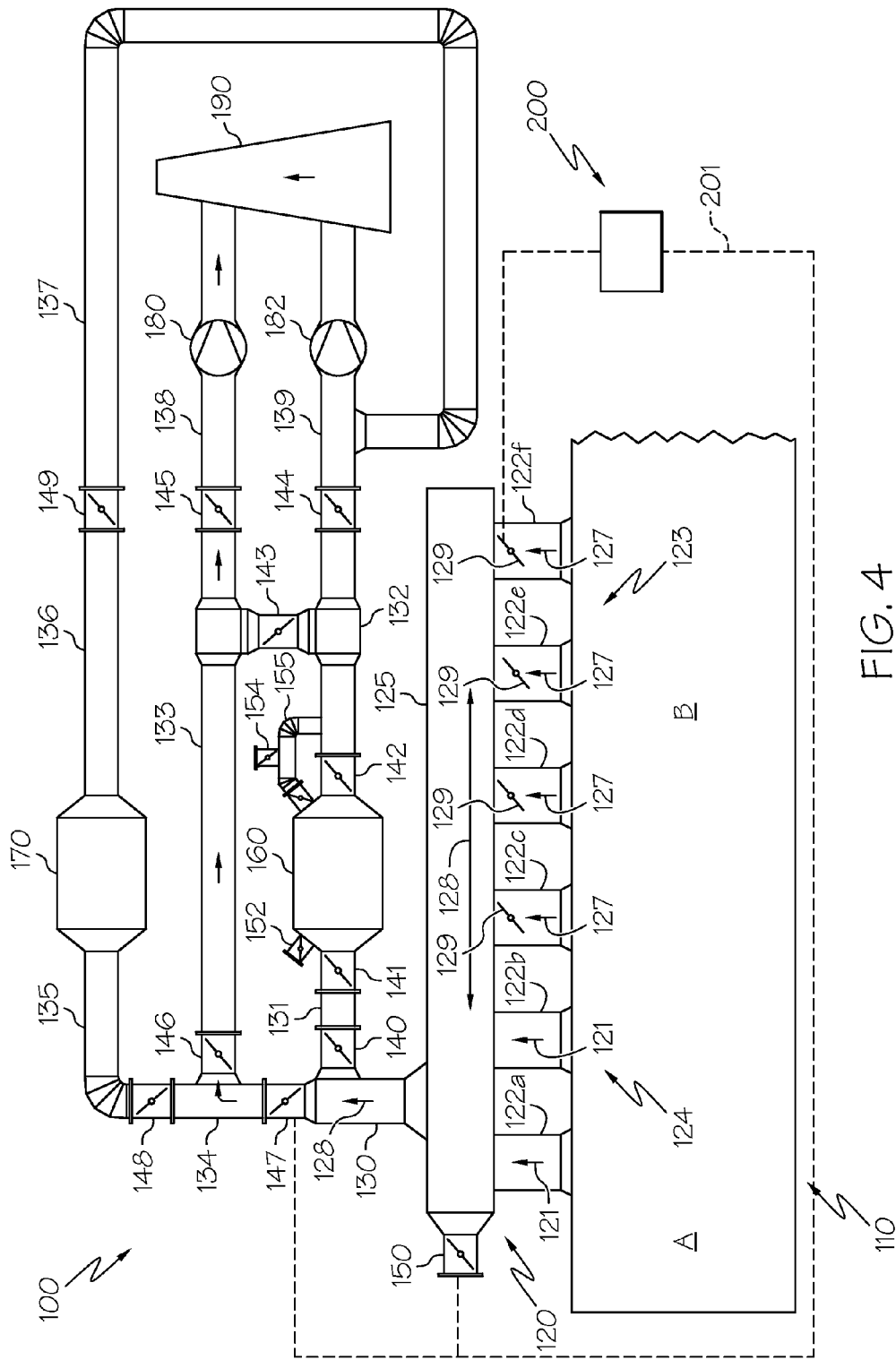
FIG. 4 schematically depicts a system for treating an air stream operating in a fourth mode of operation according to one or more embodiments.

FIG. 4 schematically illustrates a fourth mode of operation in which the hydrofluoric scrubber 170 and the catalytic thermal oxidizer 160 are both by-passed. This mode of operation may be utilized when the air stream resulting from the product being processed does not need to be treated for pollutants. In this mode, damper assemblies 140 and 141 are closed, thereby preventing the air stream from entering the catalytic thermal oxidizer 160. Additionally, damper assembly 148 is closed, thereby preventing the air stream from entering the hydrofluoric scrubber 170. Open damper assembly 146 enables the air stream to enter duct 133 where it passes through open damper assembly 145 (damper assembly 143 is closed). The air stream continues through exhaust fan 180 and out to atmosphere through exhaust 190.

It should now be understood that embodiments described herein may be utilized to treat an air stream exhausted from firing kilns used to fire ceramic substrates with a thermal oxidizer that does not require an additional or auxiliary heat source. An exhaust gas stream from a firing kiln containing pollutants such as volatile organic compounds and carbon dioxide may be mixed with a waste heat stream of the firing kiln to form an air stream having a temperature that is greater than the exhaust gas stream. The temperature of the air stream may be monitored and adjusted prior to entering a thermal oxidizer such that the temperature of the air stream is within a range to efficiently remove the pollutants by an exothermic oxidation reaction within the thermal oxidizer. Because an auxiliary heat source does not need to be purchased, operated and fueled, significant cost savings may be realized.

Additionally, it should also now be understood that embodiments described herein may also incorporate an air stream conditioning assembly or assemblies such as a hydrofluoric scrubber to remove other pollutants (e.g., hydrogen fluoride). The temperature of the air stream may be monitored and controlled such that the temperature of the air stream is within an operating temperature of the air stream conditioning assembly.

Further, it should also be understood that embodiments described herein may enable the control of an air stream such that the air stream may be directed toward or away from a thermal oxidizer and/or one or more air stream conditioning assemblies. Control of the air stream may be made possible by opening and closing damper assemblies such that the air stream is directed accordingly.

For the purposes of describing and defining the present invention it is noted that the terms "about" and "substantially" are utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It is noted that recitations herein of a component of the present invention being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments described herein, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for treating an air stream exhausted from a firing kiln utilized to heat a ceramic substrate comprising:
an outlet assembly comprising:
a plurality of exhaust housing units in fluid communication with a firing kiln for heating ceramic substrates, wherein one or more exhaust housing units of the plurality of exhaust housing units are coupled to the firing kiln at a location to receive an exhaust gas stream, one or more exhaust housing units of the plurality of exhaust housing units are coupled to the firing kiln at a location to receive a waste heat stream such that a temperature of the waste heat stream is greater than the exhaust gas stream;

an exhaust header in fluid communication with the plurality of exhaust housing units, wherein the plurality of exhaust housing units are positioned with respect to the exhaust header such that a temperature of an air stream comprising the waste heat stream and the exhaust gas stream within the exhaust header is greater than the exhaust gas stream;

a thermal oxidizer in fluid communication with the outlet assembly to receive the air stream and remove pollutants from the air stream;

a hydrofluoric scrubber in fluid communication with the exhaust header and the thermal oxidizer;

an atmospheric exhaust stack in fluid communication with the thermal oxidizer and the hydrofluoric scrubber;

a plurality of damper assemblies positioned between the exhaust header, the hydrofluoric scrubber, the thermal oxidizer, and the exhaust; and a controller communicatively coupled to individual ones of the plurality of damper assemblies, wherein individual ones of the plurality of damper assemblies are opened or closed to selectively route the air stream through the thermal oxidizer, the hydrofluoric scrubber, and the atmospheric exhaust stack.

2. The system of claim 1, further comprising:
at least one ambient air inlet fluidly coupled to the exhaust header; and
a controller communicatively coupled to the at least one ambient air inlet, wherein the controller controls the at least one ambient air inlet such that a flow of the air stream entering the outlet assembly is controlled to maintain a temperature of the air stream entering the thermal oxidizer within a range of about 300° C. to about 650° C.

3. The system of claim 1, wherein the thermal oxidizer is a catalytic thermal oxidizer.

4. The system of claim 1, further comprising an air stream conditioning assembly in fluid communication with the thermal oxidizer and the outlet assembly to receive the air stream and remove at least a portion of hydrogen fluoride within the air stream.

5. The system of claim 4, further comprising a damper assembly positioned between the air stream conditioning assembly and the thermal oxidizer, wherein when the damper assembly is in a closed position, flow of the air stream from the thermal oxidizer to the air stream conditioning assembly is prevented.

6. The system of claim 1, wherein the one or more exhaust housing units that receive the exhaust gas stream are positioned on the firing kiln upstream from the one or more exhaust housing units that receive the waste heat stream in a direction of ceramic substrate processing.

7. The system of claim 1, wherein the one or more exhaust housing units that receive the exhaust gas stream are positioned on the firing kiln at a region of lower operating temperature than the one or more exhaust housing units that receive the waste heat stream.

8. The system of claim 1, further comprising:
at least one ambient air inlet fluidly coupled to the thermal oxidizer; and
a controller communicatively coupled to the at least one ambient air inlet, wherein the controller controls the at least one ambient air inlet such that a flow of the air stream entering the outlet assembly is controlled to maintain a temperature of the air stream entering the thermal oxidizer within a range of about 300° C. to about 650° C.

9. The system of claim 1, further comprising:
at least one ambient air inlet fluidly coupled to the thermal oxidizer;
at least one ambient air inlet fluidly coupled to the exhaust header; and
a controller communicatively coupled to the at least one ambient air inlet fluidly coupled to the thermal oxidizer and the at least one ambient air inlet fluidly coupled to the exhaust header, wherein the controller controls the at least one ambient air inlets such that a flow of the air stream entering the outlet assembly is controlled to maintain a temperature of the air stream entering the thermal oxidizer within a range of about 300° C. to about 650° C.

10. The system of claim 1, wherein the one or more exhaust housing units that receive the waste heat stream include a mechanical device that is controllable to control introduction of the waste heat stream into the exhaust header.

* * * * *